July 5, 1949.　　　　H. A. CARTWRIGHT　　　2,475,219
ROTATION COMPARING APPARATUS FOR INDICATING
THE OPERATION OF PUMPS
Filed Feb. 28, 1945　　　　　　　　　　2 Sheets-Sheet 1
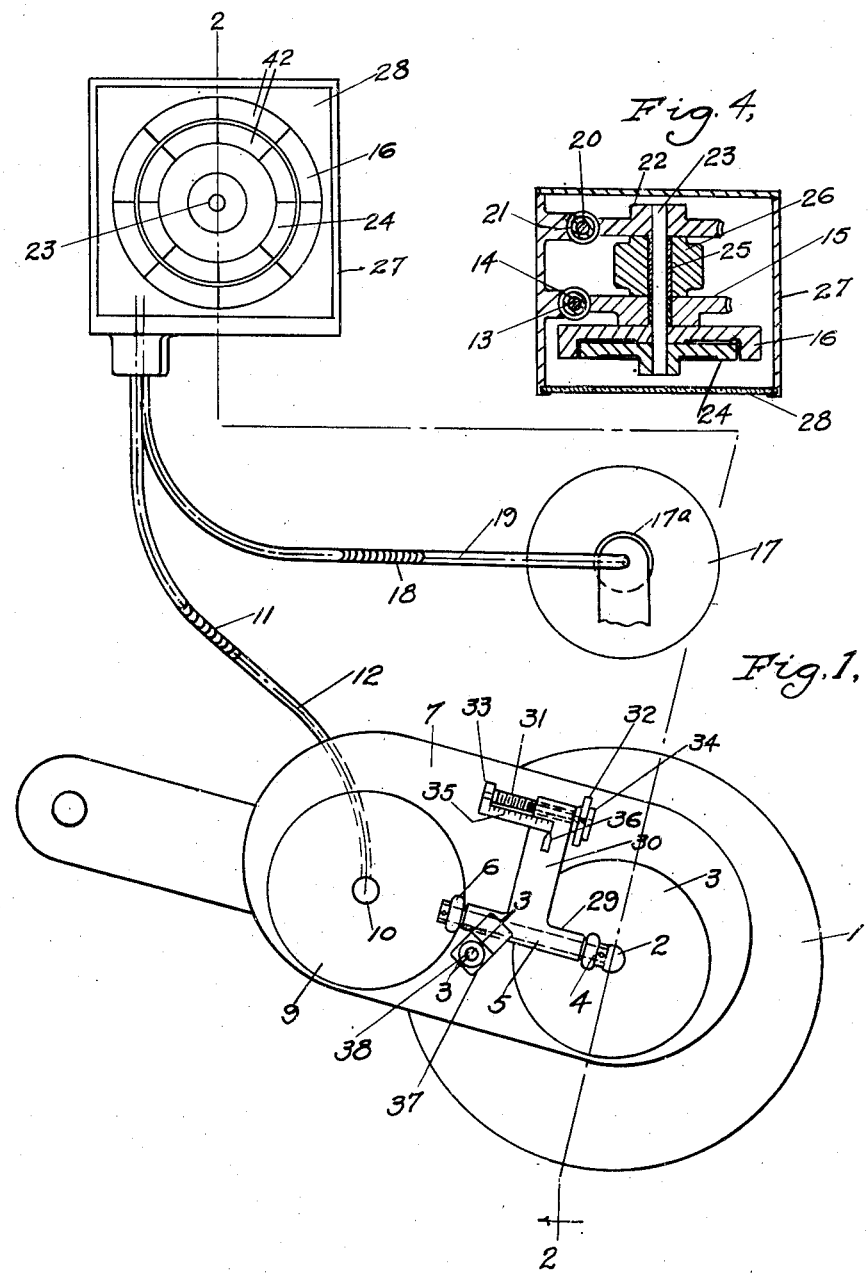
Inventor
Horace A. Cartwright

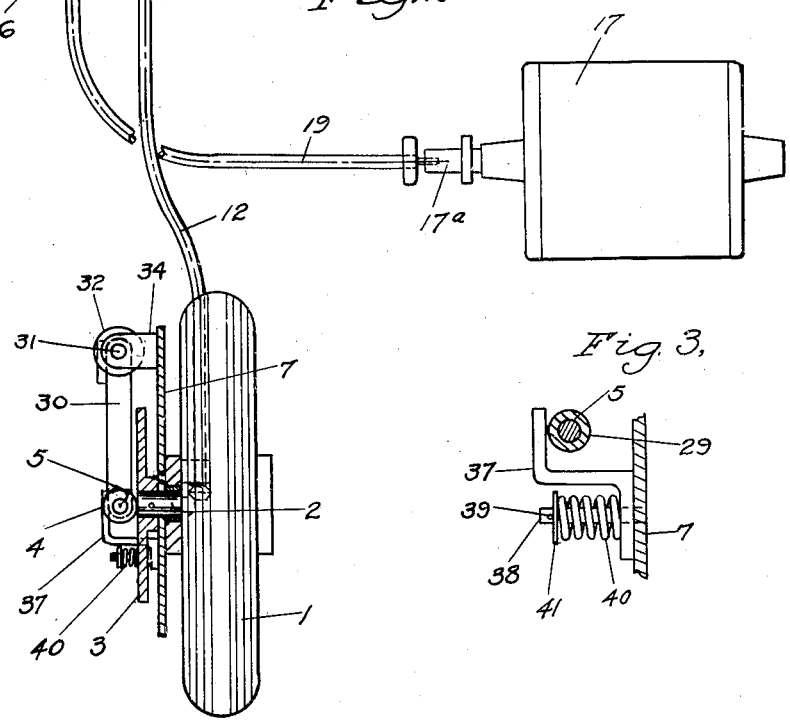

Patented July 5, 1949

2,475,219

UNITED STATES PATENT OFFICE 2,475,219

ROTATION COMPARING APPARATUS FOR INDICATING THE OPERATION OF PUMPS

Horace A. Cartwright, Galion, Ohio

Application February 28, 1945, Serial No. 580,243

2 Claims. (Cl. 235—103.5)

This invention relates to apparatus for indicating the fluid output operation of pumps, and is concerned, more particularly, with an improved means for indicating the operation of pumps of the type adapted for mounting on trucks or other automotive vehicles and utilized for forcing metered quantities of fluid bituminous compounds, drawn from a tank or other source of supply, through an apertured spray bar for distribution over road or highway surfaces.

It is an object of this invention to provide novel means whereby the pump of an automotive asphalt distributor may be operated at a speed to obtain a desired spraying pressure and truck speed adjusted thereto; or, alternately, to provide for the adjustment of the pump speed to correspond with the speed of linear advance of the truck vehicle.

In spraying bituminous materials on road surfaces, it has been the custom to either: 1. Govern the speed of the auxiliary engine driving the bituminous pump to obtain a discharge of a given quantity of material per minute, using the pump as a meter, and driving the truck vehicle a corresponding number of feet per minute. The question of spraying pressure, which is very important, is a matter of experimentation. Practice discloses that the best spraying pressure is seldom obtained from the speeds given on operational charts supplied by manufacturers with such equipment. Spraying pressures vary with the temperature and viscosity of the fluid material handled and, also, the number and size of the spray nozzles.

2. Another common method consists in governing the speed of the auxiliary engine driving the pump to discharge a surplus of bituminous material, using a pressure relief valve to return such surplus to the distributing or supply tank. Again, the truck must be driven at a constant speed according to chart indications. In this method, also, the application of the bituminous compound varies with the temperature and viscosity thereof and the discharge nozzles should be kept clean and uniform in their effective sizes.

By either method, it is necessary to hold an exact uniform truck speed at all times, which is virtually impossible under actual working conditions. Also, in the use of these customary methods, many loads are applied while adjustments and corrections are being determined. In all cases, the actual fluid application over a measured distance is an average between the fat and lean zones of compound application. For instance, in hilly or mountainous country, it is impossible to hold a uniform truck speed and if reasonable accuracy is to be secured in the application of the material, pump speed must be varied to suit the probable truck speeds.

In accordance with the present invention, the pump is used as a meter and is associated with an indicator or tachometer visible to the truck driver. A flexible shaft, driven by the pump shaft drives a worm and worm gear which, in turn, rotates a disk, present to the view of the truck operator, at a slow proportionate speed, an annulus or rim positioned around the periphery of this disk is rotated proportionately to the speed of a fifth wheel running on the ground or road surface, the rim or annulus being driven by another worm and worm gear operated by a flexible shaft which derives its power from the fifth wheel. Between the fifth wheel and the flexible shaft used in driving the rim or annulus is a variable speed transmission which can be set proportionately for different rates of fluid application per square yard and accommodated to various lengths of spray bars.

In operation, the disk and the rim must rotate together, and either the truck engine or the auxiliary engine may be manually throttled, or otherwise regulated, to produce such uniform rotation. The pump engine can be set at a speed to provide a given spraying pressure and the vehicle engine throttled to cause the rim or annulus to rotate at the same speed as the disk, or, truck speed may be maintained according to road conditions and the pump engine throttled to cause the associated disk to rotate at the same speed as the rim. Both the rim and disk function as visible speed indicators, the disk being a speed indicator for the pump and the rim a speed indicator for the fifth wheel, which in turn corresponds to truck speed in feet per minute over a road surface.

For a further understanding of the invention, and additional objects and advantages thereof, reference is to be had to the following description and accompanying drawings, wherein:

Fig. 1 is a diagrammatic side elevational view of the speed-indicating mechanism comprising the present invention;

Fig. 2 is a vertical sectional view on the plane indicated by the line 2—2 of Fig. 1;

Fig. 3 is a similar view on the line 3—3 of Fig. 1;

Fig. 4 is a horizontal sectional view on the line 4—4 of Fig. 2.

In the specific embodiment of the invention disclosed in the accompanying drawings, the numeral 1 designates a pneumatic tired wheel which is vehicle carried to engage the road surface, said wheel driving a shaft 2 which carries a rubber-faced disk 3. A small wheel 4 engages the rubber face of the disk and is driven thereby, the wheel 4 rotating a journaled shaft 5, the latter carrying at its other end a driven wheel 6 of the same size as the wheel 4. The wheel 6 is disposed in frictional engagement with the rubber face of a second disk 9 having fixed thereto an axle 10 which is journaled in the frame structure 7. The axle 10 is drilled and slotted to receive one end of the core 11 of a flexible shaft, the casing of the latter being indicated at 12, said flexible shaft being extended to a tachometer housing situated within the convenient view of the truck operator. The core 11 of said flexible shaft drives a worm shaft 13 which is rotatably journaled in a vertical position in said housing. The shaft 13 carries a worm 14 which rotates a worm gear 15 and an associated recessed wheel 16, the latter being herein identified as an annulus or rim.

Suitably supported on the truck vehicle is an engine driven pump 17. This pump is preferably driven by an engine independent of the propelling engine of the truck vehicle, the pump serving to withdraw a heated bituminous fluid from a supply tank, not shown, and to force said fluid through the nozzles of a spray bar, also not shown, upon road or highway surfaces. The pump includes an exteriorly projecting impeller shaft 17a which is adapted to drive the core 18 of a second flexible shaft, the casing of the latter being indicated at 19, said second flexible shaft leading to the tachometer housing. The core 18 within said housing drives a worm shaft 20 which carries a worm 21, the latter rotating a worm gear 22 fixed on one end of a journaled shaft 23, the opposite end of this shaft having fixed thereto a disk 24. The shaft 23 rotates in a bearing 25 formed in a bracket 26 which projects upwardly from the base of the tachometer housing 27, the open front of the latter being closed by a glass panel 28 so that the rim 16 and the disk 24 will be presented to the view of the truck operator.

It will be seen that the disk 24 rotates slowly in exact proportion to the speed rotation of the pump shaft. Likewise, the rim 16 similarly rotates in exact proportion to the speed of linear advance of the truck vehicle. It is necessary to vary one of these proportionate speeds to provide for different quantities per square yard of the bituminous material to be sprayed and for different widths of road surfaces to be covered by said material. In this respect, I prefer to vary the proportion between the truck speed and the rim 16.

In securing this result, the shaft 5 is mounted for rotation in a bearing 29 provided in a carrier bracket 30 which is mounted for adjustment adjacent to the friction disks 3 and 9. The bracket 30 is formed with a threaded bore to receive a screw 31, the latter having fixed thereto a hand wheel 32 by which the screw may be rotated. The ends of the screw 31 are journaled in bearing extensions 33 and 34 carried by the frame structure 7. A graduated scale 35 may be fixed to one or both of said extensions and a pointer 36 is fixed to the bracket 30 for movement with the latter adjacent to the graduated edge of the scale 35.

When the screw 31 is rotated, the carrier bracket is moved longitudinally thereof, changing the location of the wheels 4 and 6 on the friction disks 3 and 9 and thereby varying the ratio between truck speed to which the wheel 1 responds and the rotational speed of the rim 16. The wheel 1 rotates rapidly in order to turn the rim 16 at a speed commensurate with a pump speed of approximately two hundred revolutions per minute. As the wheel 6 approaches the center of the disk 9, the ratio changes, requiring a lower speed of the wheel 1 to secure the same number of revolutions per minute on the part of the rim 16. The wider the road, and the heavier the application of bituminous material, the closer the wheel 6 is set to the center of disk 9. Charts may be supplied reading in inches to show the correct settings for a given fluid output. Corrections, of course, can be made in the settings for variations in pump output per revolution due to increased pressures and temperatures at which the material is applied. To hold the wheels 4 and 6 in proper frictional contact with the rubber faces of the disks 3 and 9, use is made of a bracket 37 which engages the bearing region 29 of the carrier bracket 30.

The bracket 37 is supported on a stud 38 carried by the frame structure 7. The outer end of the stud 38 carries a pin 39 which acts as a seat for a washer 41, the latter being held in engagement with said pin by a coil spring 40 which surrounds the pin 39 and presses on the bracket 37 to hold the latter in resilient engagement with the carrier bracket 30 and the wheels 4 and 6 in desired frictional contact with the disks 3 and 9. The bracket 37 may be turned about the axis of the pin 38 to a position free of the carrier bracket 30 so that the latter may be conveniently adjusted on the screw 31 to secure different operational positions of the wheels 4 and 6 with respect to the faces of the disks 3 and 9.

The surfaces of the rim 16 and the disk 24, which are viewable to the truck operator, may be provided with indexing graduations or with segments of distinctive contrasting coloration, as at 42, so that the operator will have no difficulty in ascertaining when the rim 16 and the disk 24 are rotating in unison or at the same rotational speed. Before a given road area is sprayed, the wheels 4 and 6, through adjustment of the bracket 30, are properly adjusted with respect to the driving and driven friction disks 3 and 9 to secure a predetermined rotational speed on the part of the rim 16 which, as previously stated, is proportional to the speed or rate of linear advance of the truck vehicle. Information as to the setting of the wheels 4 and 6 may be supplied by charts.

With the truck vehicle in motion, the auxiliary engine driving the pump 17 is manually regulated in order to rotate the impeller shaft of the pump at the required number of revolutions per minute to cause the disk 24 to rotate synchronously with the rim 16. When this condition obtains, the truck operator will know at a glance that the required amount of the bituminous material is being applied to the road surface.

While I have set forth in detail the use of my improved indicating device as it is used in connection with apparatus for spraying fluid-like bituminous compounds on road surfaces or highways, it will be understood that its usefulness is not confined to such apparatus alone, since it may be employed in connection with many other types of apparatus where coordination of the fluid output of a vehicle-mounted pump with the rate of linear advance of the supporting vehicle is desirable, as in various types of road material mixing and distributing machines. Again, while I have found it convenient from a standpoint of space requirements to use a road-engaging wheel separate from the ordinary traction wheels of a vehicle to operate one of the coaxial indicators, nevertheless other devices, mechanically responsive to the rate of advance of the vehicle, may be utilized within the purview of my invention. Likewise, the variable speed drive may be operated by the pump mechanism as an alternative to the vehicle drive disclosed. Therefore, I reserve the right to employ all such modifications that may be said to fall fairly within the scope of the folowing claims.

I claim:

1. Indicator-actuating mechanism for road vehicles comprising a frame pivotally mounted on an associated vehicle for swinging movement in a vertical plane, a road-engaging wheel rotatably carried by said frame, an axle for said wheel, a disk mounted on said axle for rotation in unison therewith, a second disk rotatably mounted on said frame adjacent to said first-named disk, a bracket adjustable longitudinally of said frame, a pair of spaced friction wheels rotatably carried by said bracket, said wheels being engageable with the faces of said disks and through the adjustment of said bracket being movable radially of said disks to engage the latter at various distances from their centers of rotation, a speed-indicating device, and means driven by the second of said disks for actuating said device.

2. Indicator-actuating mechanism for road vehicles comprising a frame pivotally mounted on an associated vehicle for swinging movement in a vertical plane, a road-engaging wheel rotatably carried by said frame, an axle for said wheel, a disk mounted on said axle for rotation in unison therewith, a second disk rotatably mounted on said frame adjacent to said first-named disk, a bracket adjustable longitudinally of said frame, a pair of spaced friction wheels rotatably carried by said bracket, said wheels being engageable with the faces of said disks and through the adjustment of said bracket being movable radially of said disks to engage the latter at various distances from their centers of rotation, a speed-indicating device, means driven by the second of said disks for actuating said device, and spring-pressed means carried by said frame and cooperative with said bracket for positively maintaining said friction disks in power-transmitting engagement with the surfaces of said disks.

HORACE A. CARTWRIGHT.

REFERENCES CITED

The following references are of record in the file of this patent:

UNITED STATES PATENTS

| Number | Name | Date |
|---|---|---|
| 558,315 | Shaw | Apr. 14, 1896 |
| 1,377,963 | Howath | May 10, 1921 |
| 1,417,048 | Farmer | May 23, 1922 |
| 1,924,144 | Woodcock et al. | Aug. 29, 1933 |
| 2,031,262 | Hill, Jr. | Feb. 18, 1936 |
| 2,112,704 | Mackay | Mar. 29, 1938 |
| 2,154,503 | French et al. | Apr. 18, 1939 |
| 2,159,319 | Cartwright | May 23, 1939 |
| 2,256,170 | Powers | Sept. 16, 1941 |
| 2,279,551 | Bossi | Apr. 14, 1942 |

OTHER REFERENCES

Page 2 of a pamplet entitled "Accuracy in the Application of Asphalt and Road Oils," published by Cartwright Asphalt Equipment Co., Independence, Kansas.